United States Patent [19]
Shigeta et al.

[11] 3,930,632
[45] Jan. 6, 1976

[54] ADJUSTABLE SEAT ASSEMBLY

[75] Inventors: Masahiko Shigeta, Isehara; Gonshiro Miyoshi, Hiratsuka; Hisakazu Murakami, Fujisawa; Shoji Ogata, Ohta, all of Japan

[73] Assignees: Nissan Motor Company Limited, Yokohama; Ichikoh Industries Limited, Tokyo, both of Japan

[22] Filed: Dec. 26, 1973

[21] Appl. No.: 427,901

[30] Foreign Application Priority Data
Dec. 27, 1972 Japan.............. 47-148046

[52] U.S. Cl............................ 248/429; 297/346
[51] Int. Cl.² ........................... F16M 13/00
[58] Field of Search ......... 248/424, 423, 429, 420, 248/430; 297/346; 104/118, 120, 134

[56] References Cited
UNITED STATES PATENTS

| | | | |
|---|---|---|---|
| 2,396,511 | 3/1946 | Issigonis................... | 248/429 |
| 2,868,273 | 1/1959 | Barrett..................... | 248/429 X |
| 2,964,093 | 12/1960 | Lohr et al................. | 248/429 |
| 3,198,139 | 8/1965 | Durk........................ | 104/120 X |
| 3,208,400 | 9/1965 | Bingham................... | 104/120 |
| 3,381,927 | 5/1968 | Stamates................... | 248/429 |
| 3,445,143 | 5/1969 | Swenson................... | 248/429 X |
| 3,507,472 | 4/1970 | Agee et al................. | 248/429 |
| 3,595,171 | 7/1971 | Sheppard................. | 104/134 X |
| 3,756,094 | 9/1973 | Mauron................... | 248/429 X |
| 3,806,191 | 4/1974 | Stegmaier................ | 248/429 X |

FOREIGN PATENTS OR APPLICATIONS

| | | | |
|---|---|---|---|
| 737,270 | 6/1966 | Canada.................... | 248/430 |

*Primary Examiner*—Roy D. Frazier
*Assistant Examiner*—Robert W. Gibson, Jr.

[57] ABSTRACT

Seat adjusting mechanism providing a multiplicity of fore-and-aft adjustment positions of a vehicle adjustable seat in which an upper moving guide rail supporting the seat and a lower fixed guide rail comprise two vertical flanges per each rail, the flanges on the upper and lower rails firmly gripping each other thereby preventing the upper rail from being torn off from the lower rail. The mechanism further comprises an improved lock device associated with the flanges on the upper rail.

6 Claims, 8 Drawing Figures

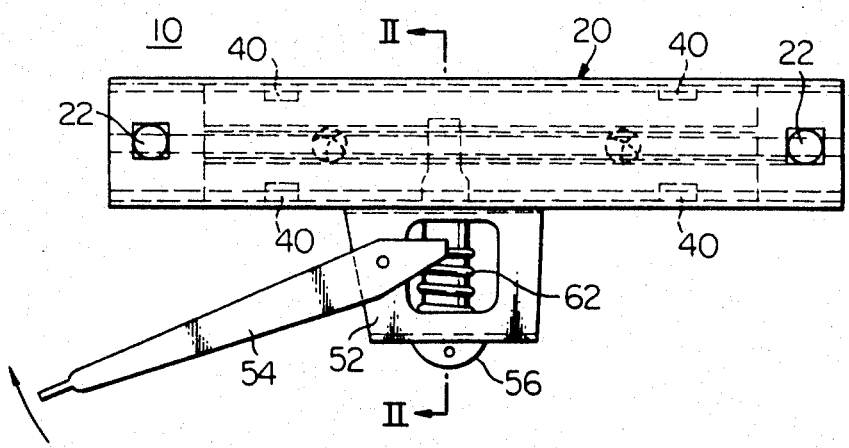
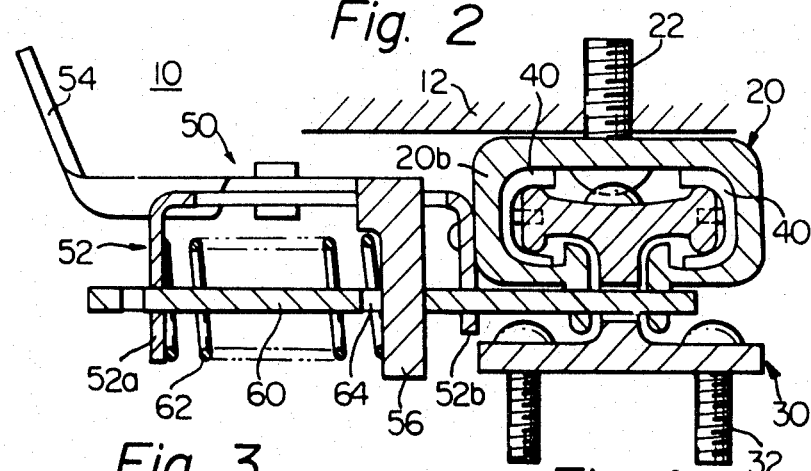
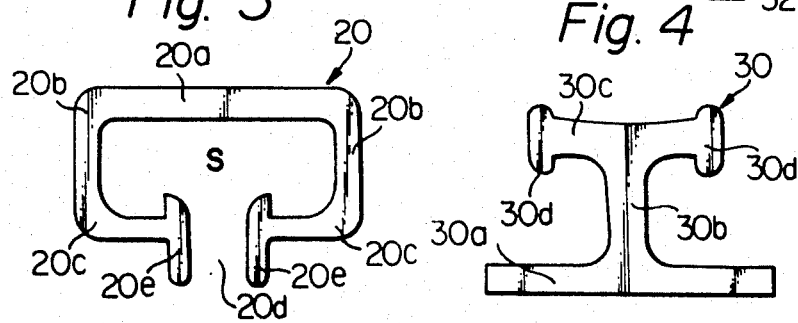

ADJUSTABLE SEAT ASSEMBLY

This invention relates to an adjustable seat assembly of a vehicle and more particularly it relates to an improved adjusting mechanism to provide a multiplicity of fore-and-aft adjusted positions of the seat.

In general, a mechanism for effecting horizontal adjustment movements comprises a pair of spaced, lower guide rails fixed to a vehicle body floor and a pair of spaced, upper moving guide rails which bear on the respective lower guide rails to be slidable thereon and support thereon a seat cushion frame. The upper rails are moved to a desired one of the multiple positions by the seat occupant. The adjusting mechanism further comprises a lock device operative to fix the upper rails to the desired position.

The present invention has an object to improve a adjustable seat assembly of the type described so as to provide greater ease and convenience of operation and increased structural strength of the assembly.

Another object of the invention is to provide an improved seat adjusting mechanism having particularly configured upper and lower rails for securely engaging the upper rail and the lower rail.

Still another object of the invention is to provide an improved adjustable seat assembly for smooth fore-and-aft movement of the upper rail with minimized friction between the upper and lower guide rails.

A further object is to provide a lock device for use with the adjustable seat assembly which will give reliable and trouble-free operation over a prolonged period of time.

These and other objects, features and advantages of the invention will be readily apparent from the following description of exemplary preferred embodiments thereof, taken in conjunction with the accompanying drawings, in which:

FIG. 1 is a top plan view of an adjustable seat assembly according to a preferred embodiment of the present invention;

FIG. 2 is a view in section taken along a line II—II of FIG. 1;

FIG. 3 is a view in section showing a preferred embodiment of an upper slidable guide rail used in the seat assembly of FIGS. 1 and 2;

FIG. 4 is a view in section showing a preferred embodiment of a lower stationary guide rail used in the seat assembly of FIG. 1;

FIG. 5 is a perspective view of the upper slidable rail shown in FIG. 3;

FIG. 6 is a perspective view of the lower guide rail shown in FIG. 4;

FIG. 7 is a perspective enlarged view of a member used in the seat adjusting mechanism of FIGS. 1 and 2;

FIG. 8 is a view in section showing another preferred embodiment of a lower guide rail with an upper slidable rail.

It should be noted that expressions like "upper rail", "lower rail", "bottom" etc. used in the description and claims refer to relative locations as they normally are.

Reference is now made to the accompanying drawings, in which similar reference characters indicate corresponding elements throughout the several views.

As shown on FIGS. 1 and 2, and adjustable seat assembly generally indicated at 10 comprises an upper slidable guide rail 20 and a lower guide rail 30 both extending in the longitudinal direction of the vehicle and a seat cushion frame 12 supported thereon. Although the upper rails and lower rails are as usual employed respectively in pairs, only one of each rail is shown for the sake of simplicity. As best seen in FIGS. 3 and 4, the upper and lower rails are particularly configured according to the present invention. The upper rail consists of a box-profiled beam which has formed with a top panel 20a, base panel 20c and two side panels 20b interconnecting the top and base panels. The top panel 20a is secured to the seat cushion frame 12 by bolts 22. The base panel 20c of the upper rail defines and opening 20d extending throughout its longitudinal length. The base panel 20c is further provided with two vertical flanges 20e formed integrally on and at right angle to the respective edges of the base panel defining the opening. The vertical flanges thus project up and downward from the edges of the base panel. A substantially T-shaped space S is thus formed by the interior wall of the box-profiled beam and their vertical flanges 20e.

The lower rail 30 consists of an I beam having a top flange portion 30c, a bottom flange portion 30a and a web 30b interconnecting the top and bottom flange portions. The bottom flange portion 30a is fastened by bolts 32 to the floor of the vehicle body (not shown). The top flange portion 30c is also provided with two vertical flanges 30d similar to the flanges 20e. In an assembled condition, the upper half of the lower guide rail 30 is fitted into the T-shaped space S of the upper rail 20. As is apparent from FIG. 2, a portion of the interior wall of the upper rail, which consists of a small part of the top panel wall, a side panel wall, a bottom panel wall and the vertical flange wall, is configured to substantially correspond to the configuration of the vertical flange 30d to embrace it therein. More specifically, the portion of the upper rail interior wall and the vertical flange 30d are all chamfered at their corners. The vertical flange 20e in turn is embraced and gripped by a portion of the lower rail exterior wall consisting of the underside of the top flange portion 30c and the web wall. The lower rail exterior wall and the vertical flange 20e are configured in the same manner as the upper rail interior wall and its engaging vertical flange 30d.

The configuration of the upper and lower rails above described is advantageous particularly for an automobile seat in which anchor portions of a restraining safety harness are fixed to a seat adjusting mechanism upper rail to save the seat occupant trouble in adjusting the safety harness upon each fore-and-aft movement of the seat. In a collision, an extremely high load is applied to the safety harness of the type referred to and therefore to the seat itself because of inertia of the occupant's body. As a result, the upper guide rail together with the seat thereon may be torn off from the lower guide rail, if the safety harness is firmly enough anchored to the upper rail. The seat occupant is then thrown forward causing a danger of serious injury. This danger is prevented according to the present invention in a manner that, when an abnormal force acting on the upper rail tends to raise and separate the upper rail from the lower rail, the adjacent faces of the engaging vertical flanges 20e and 30d abut against one another thereby preventing occurrence of such separation.

Since, as is commonly known, processing by extrusion or drawing permits a greater variety of complicated beam profiles to be formed than by pressing, the upper and lower rails of this invention are preferably formed by extrusion or drawing.

Furthermore, according to the invention, a pair of friction reducing members 40 shown in FIG. 7 is interposed between the interior wall of the upper rail 20 and the respective vertical flanges 30d. Each member 40, made of frictionless plastic material, is curved substantially along the interior of the upper guide rail and is gradually reduced in thickness toward the bottom of the upper rail. Each member 40 is fastened to the vertical flanges 30d of the lower rail by two pins 42. The upper rail 20 thus smoothly slides on the members 40 attached to the lower guide rail with the friction between the two rails being significantly reduced. At least two pairs of members 40 are preferably disposed within the length of the rails for sufficient friction reducing effect.

A lock device 50 operable to fix the upper rail to a desired adjustment position is constructed as follows: As best seen in FIG. 2, a support bracket 52 of inverted U shape is secured to one side panel 20b of the upper rail 20. A swing lever 54 manually operable by the seat occupant is near its one end pivotally mounted on the top wall of the bracket 52. A guide block 56 is connected to and is integral with the lever 54 at the one end. The guide block 56 extends downward through an aperture (no numeral) formed through the top wall of the bracket 52. As the lever 54 is turned by the seat occupant in the clockwise direction as shown in FIG. 1, the guide block 56 moves away from the side panel of the upper rail 20.

The bracket 52 supports also a locking bar 60 in a manner that the bar 60 slidably passes through holes (no numeral cut through the side walls 52a and 52b of the bracket 52. The bar 60 is shown to have a hole 64 through which the guide block 56 passes. The bar 60 is usually biased by a spring 62 toward the assembled upper and lower rails 20 and 30. As viewed in FIGS. 5 and 6, there is formed two opposite notches 24 through the respective vertical flanges 20e of the upper guide rail 20, while a plurality of holes 34 are cut through the web portion 30b of the lower guide rail 30. When, in an assembled condition of the upper and lower guide rails, the notches 24 are aligned with any one of the holes 34, the locking bar 60 by the action of the spring 62 passes through the aligned notches 24 and hole 34 as illustrated in FIG. 2. It will be readily understood that the bar 60 in this position prevents the fore-and-aft movement of the upper rail 20. When the occupant turns the lever 54 clockwise (FIG. 1) and the guide block 56 moves in the described manner, due to its engagement in the hole 64, the bar 60 is withdrawn from the notches 24 and the hole 34 thereby permitting free adjustment movement of the upper rail 20 relative to the lower rail 30.

Conventionally, a flexible wire or cable has been employed to release an upper rail for movement by a lock device of the type described. Such drawbacks are incidental to the use of the wire or cable that the wire or cable will inevitably extend with time and that the adjustment of the wire or cable to a desired length is relatively difficult. It should be appreciated that according to the invention the locking bar is advantageously controlled by a swing lever which is free from the described drawbacks, enabling dependable operation of the lock device.

Referring to FIG. 8, one edge of the bottom flange portion 30a' of the lower rail 30' extends downwardly substantially at a right angle to the bottom flange portion 30a' to form an extension 30e. The extension 30e serves as a bracket to firmly mount the lower guide rail 30' to the vehicle body floor.

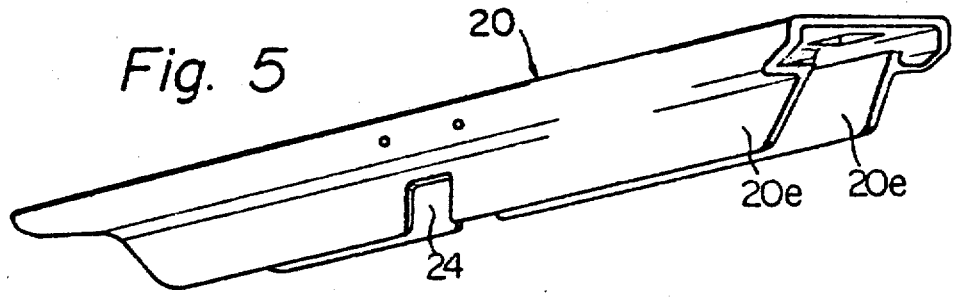
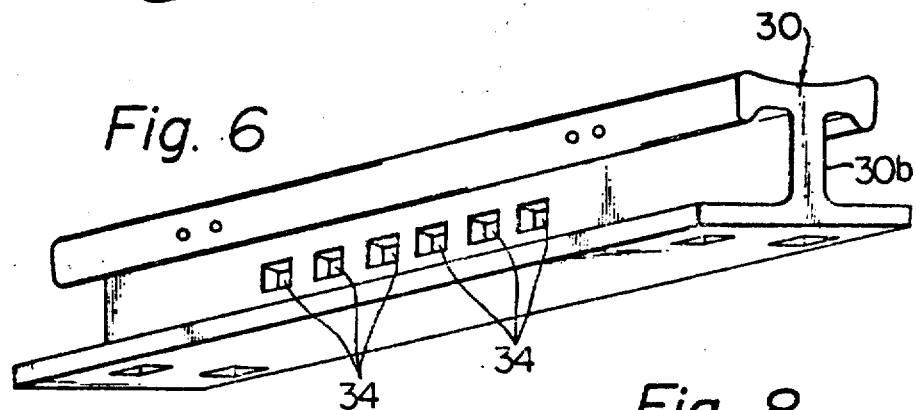
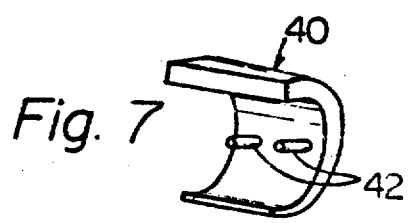
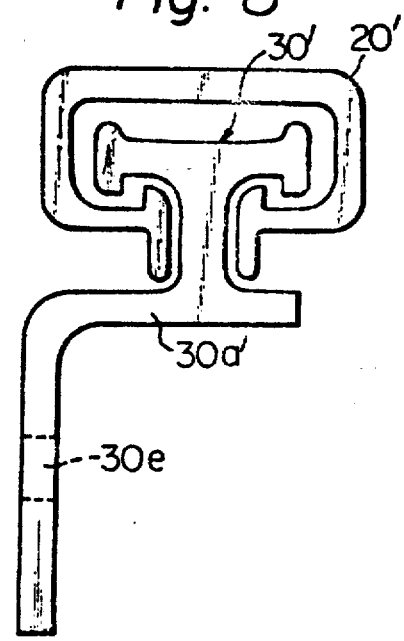

What is claimed is:

1. An adjustable seat assembly of a vehicle comprising a seat cushion; a frame mounting the seat cushion thereon; a pair of box-section upper guide rails each having a top panel secured to the frame of the seat cushion, a base panel through which an opening is formed throughout the length of the upper rail, two side panels interconnecting the top and base panels and two upper rail vertical flanges integrally on and at right angle to the respective edges of the opening of said base panel, forming therewith a generally T-shaped configuration; a pair of I-beam lower guide rails each having a top flange portion, with spaced apart edges on which the upper guide rail is slidably supported, a bottom flange portion secured to the floor of the vehicle, a web interconnecting the top and bottom flange portions and two lower rail vertical flanges integrally on and at right angle to the respective edges of said top flange portion, and forming therewith a generally T-shaped configuration, said lower rail vertical flange being embraced by an interior wall formed by a portion of the top panel, side panel, base panel and vertical flange of the upper guide rail, said interior wall being configured to correspond to the lower rail vertical flange, said upper guide rail being assembled with said lower guide rail, such that said assembly thereby provides an arrangement whereby, upon application of force tending to separate the upper rail from the lower rail of the assembly in any direction, the upper rail vertical flange and the lower rail vertical flange engage one another to prevent such separation; and means for restraining the longitudinal movement of said upper guide rail relative to the lower guide rail including a locking bar laterally passable through the upper rail vertical flanges and the lower rail web.

2. An assembly as in claim 1, wherein said upper rail vertical flange is embraced by an exterior wall formed by the lower rail vertical flange, bottom flange portion and web portion of the lower rail, said exterior wall being configured to correspond to the upper rail vertical flange.

3. An assembly as in claim 1, further comprising at least two pairs of friction reducing members each fitted between the interior wall of the upper guide rail and the lower rail vertical flange, said friction reducing member being curved substantially along the interior wall of the upper rail and being gradually reduced in thickness toward the bottom flange portion of the upper rail.

4. An assembly as in claim 1, further comprising an extension integrally depending from one edge of the lower rail bottom flange portion, at which the lower rail is mounted on the floor of the vehicle body.

5. An assembly as in claim 1, wherein said restraining means includes a manually operable lever pivotally mounted on a support adjacent the assembled upper and lower rails, said lever forming an integral guide block at one end thereof, said locking bar being movable across the assembled upper and lower guide rails and normally urged by a spring toward the assembled rails, said locking bar having a hole through which said guide block passes, said locking bar passing through two opposite notches formed respectively at lower portions of said upper rail vertical flange and through one of a plurality of holes formed in said lower rail web portion when said notches and said one of holes are aligned with each other, while when the lever is manually turned in a predetermined direction said locking bar overcoming the action of the spring is withdrawn from said notches and said hole thereby allowing free movement of the upper rail.

6. An adustable seat assembly of a vehicle comprising a seat cushion; a frame mounting the seat cushion thereon; a pair of box-section upper guide rails each having a top panel secured to the frame of the seat cushion, a base panel through which an opening with facing edges is formed throughout the length of the upper rail and two side panels interconnecting the top and base panels; two upper rail vertical flanges integrally on and at right angle to the respective edges of said base panel, and forming therewith a generally T-shaped configuration, said upper rail vertical flanges respectively having two opposite notches at their lower portions; a pair of I-beam lower guide rails each having a top flange portion, with spaced apart edges, on which the upper guide rail is slidably supported, a bottom flange portion secured to the floor of the vehicle and a web portion interconnecting the top and bottom flange portions, said web portion having a series of longitudinally arranged holes any one of which can be aligned with said two opposite notches in accordance with longitudinal movement of the upper rail; two lower rail vertical flanges integrally on and at right angle to the respective edges of said top flange portion, and forming therewith a generally T-shaped configuration, said lower rail vertical flange being embraced by an interior wall formed by a portion of the top panel, side panel base panel and vertical flange of the upper guide rail said interior wall being configured to correspond to the lower rail vertical flange, said upper guide rail being assembled with said lower guide rail, such that said assembly thereby provides an arrangement whereby, upon application of force tending to separate the upper rail from the lower rail of the assembly in any direction the upper rail vertical flange and the lower rail vertical flange engage one another to prevent such separation; and means for restraining the longitudinal movement of said upper guide rail comprising a manually operable locking member which is urged by a spring to pass through one of said opposite notches of the upper rail, one of said series of holes in the lower rail web and the other of said notches in this sequence when said two notches and said one of holes are aligned with each other, while said member is manually operated to be withdrawn from said aligned notches and hole thereby allowing free longitudinal movement of the upper rail.

* * * * *

UNITED STATES PATENT OFFICE
CERTIFICATE OF CORRECTION

PATENT NO. : 3,930,632
DATED : January 6, 1976
INVENTOR(S) : Masahiko Shigeta et al It is certified that error appears in the above-identified patent and that said Letters Patent are hereby corrected as shown below:

The sheet of drawing containing Figs. 5-8 as shown on the attached page should be included.

Signed and Sealed this eighteenth Day of May 1976

[SEAL]

Attest:

RUTH C. MASON
Attesting Officer

C. MARSHALL DANN
Commissioner of Patents and Trademarks